Feb. 29, 1944.  A. B. AUSTIN  2,343,131
TRACTION DEVICE
Filed Nov. 17, 1941  2 Sheets-Sheet 1
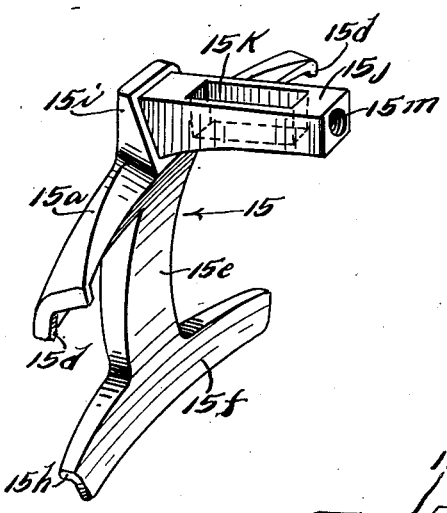
Fig. 1.
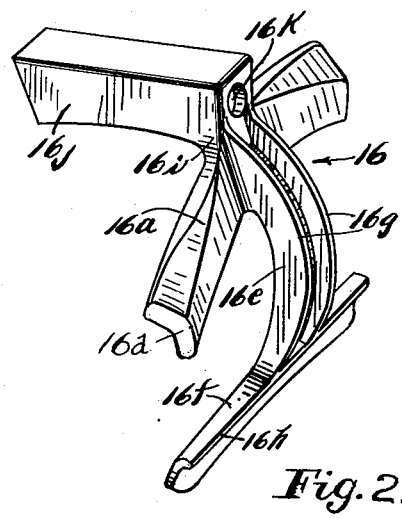
Fig. 2.
Fig. 3.
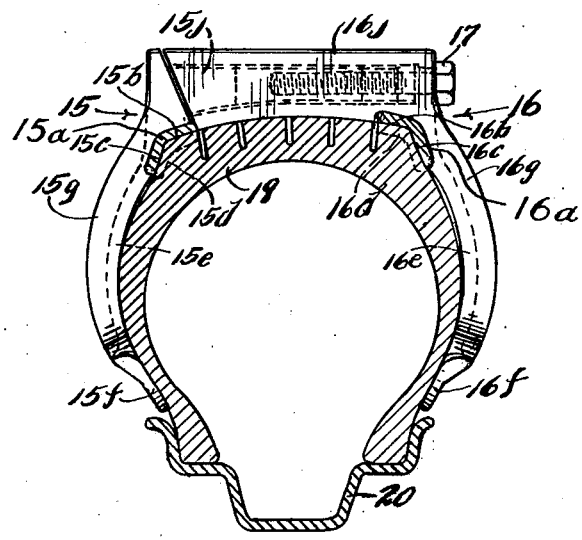
Fig. 4.
Inventor
ALBERT B. AUSTIN
By Chas. C. Reif
Attorney Inventor
ALBERT B. AUSTIN
By Chas. C. Reif
Attorney Patented Feb. 29, 1944

2,343,131

UNITED STATES PATENT OFFICE 2,343,131

TRACTION DEVICE

Albert B. Austin, Minneapolis, Minn.

Application November 17, 1941, Serial No. 419,425

7 Claims. (Cl. 152—228)

This invention relates to a traction device adapted to be applied to the tire on the wheel of an automobile vehicle. In the embodiment of the invention illustrated the invention is shown in the form commonly called a mud lug.

It is desirable in such a device to have the same so constructed that it can be quickly and easily applied to the tire or wheel. One objection to the devices of the prior art is that it is quite a task to place the same on the wheel and the operator usually gets very much soiled in doing so. It is another important requirement of such a device that it be so constructed that it will not slip on the tire or come off when operating in very rough ground, in very soft mud or in snow.

It is an object of this invention therefore, to provide a traction device of simple construction which can be very easily and readily placed on the tire and easily and quickly tightened in securely fastened position.

It is another object of the invention to provide a traction device constructed and arranged to be easily placed on and secured on the tire in such a manner that it grips the tire at spaced points so that it will not be loosened or come off in use.

It is a further object of the invention to provide a traction device or mud lug comprising members adapted to be disposed at the opposite sides of the tire and having inter-engaging portions, one of which extends transversely of the tread of the tire together with means for relatively moving said members to separate the same, so that the device can be easily placed over the tire, and to draw said members together to clamp the same on said tire, said members having tire engaging portions extending a substantial distance circumferentially of the tire.

It is still another object of the invention to provide a traction device comprising a pair of traction members disposed at opposite sides of the tire having inter engaging portions, one of which extends transversely of the tread of the tire, said members extending inwardly quite a distance so as to engage the tire inwardly of its widest portion, said members being movable toward and from each other and also having portions engaging the corners of the tread of the tire.

It is also an object of the invention to provide a traction device comprising a pair of members disposed at opposite sides of the tire having means extending transversely of the tread of the tire and having portions extending along the corners of the tread of said tire, said portions having means adjacent their ends for pressing into and gripping the tire.

Another object of the invention is to provide a traction device comprising a pair of members disposed at opposite sides of the tire having means extending transversely of the tread of said tire and being relatively movable transversely so as to be placed over and tightened on the tire, said members having portions extending inwardly to engage the tire inwardly of its widest portion, said portions extending circumferentially of the tire for some distance, said members also having portions engaging the corners of the tread of the tire, said portions engaging the tire inwardly of its widest portion being arranged to engage the tire first as said members are moved together.

These and other objects and advantages of the invention will be fully set forth in the following description made in connection with the accompanying drawings in which like reference characters refer to similar parts throughout the several views and in which:

Fig. 1 is a perspective view of one member of the device;

Fig. 2 is a perspective view of the other member of the device, said members being arranged in separated opposed relation in said views;

Fig. 3 is a perspective view of the screw used to relatively move said members;

Fig. 4 is a view in vertical section taken substantially on line 4—4 of Fig. 8 showing the device applied to a tire, said tire and the accompanying rim being shown in radial cross section;

Figure 5:
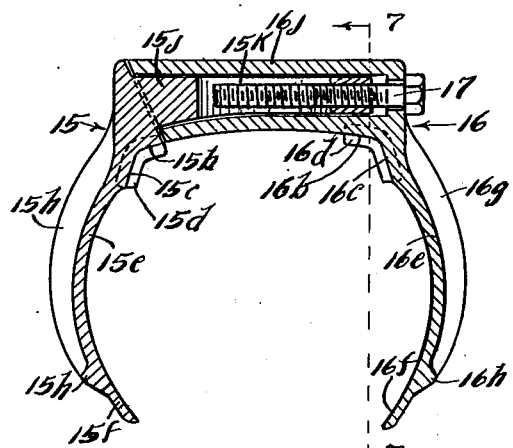
Fig. 5 is a vertical section taken substantially on line 5—5 of Fig. 8.
Figure 6:
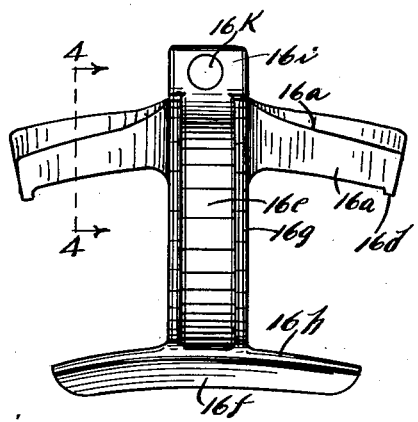
Fig. 6 is a view in side elevation of one of the members of the device.

Referring to the drawings, a traction device is shown comprising a pair of members 15 and 16 respectively. Said members are adapted to be disposed in opposed relation at opposite sides of the tire on an automotive vehicle wheel. Said members have upper portions 15a and 16a respectively which extend circumferentially of the tire and are constructed and arranged to engage the corner of the tire tread. Said portions are thus curved to extend along the tire as shown in Figs. 1, 2, 6 and 7. Said portions are provided with surfaces 15b, 15c, 16b and 16c respectively which extend at an angle to each other so as to engage the top of the tread and the side of the tire adjacent thereto. Portions 15a and 16a at or adjacent their ends have inwardly extending flanges 15d and 16d respectively adapted to bight into or press into the tread to securely hold said members 15 and 16 in position. Said members 15 and 16 also have curved portions 15e and 16e extending inwardly from portions 15a and 16a, the same having at their inner end portions 15f and 16f respectively which engage the tire inwardly of its widest portion. It will be seen that portions 15f and 16f extend circumferentially of the tire for a substantial distance at each side of the portions 15e and 16e. Portions 15f and 16f are curved to fit along and engage the side of the tire. It will be noted that portions 15e and 16e are of channel shape, thus having outwardly directed flanges 15g and 16g. Portions 15f and 16f have circumferentially extending flanges 15h and 16h respectively some distance above their lower edges, said portions having outer surfaces disposed at an angle to each other.

Portion 15a has upstanding centrally therefrom a lug or portion 15i from which projects portion 15j, the latter extending substantially at right angles to portion 15a and thus in a direction to extending transversely of the tire. Portion 15j is shown as having a vertically extending opening or passage 15k therethrough and at its outer end is provided with a bored and tapped hole 15m. Portion 16a has a vertically extending lug or portion 16i disposed centrally thereof and this projects to form portion 16j which is of rectangular cross section and provided with an opening adapted to receive portion 15j. Said portion 16i has a cylindrical bore or opening 16k therethrough adapted to receive a bolt 17 which screws into the tapped hole 15m as shown in Fig. 5. It will be seen that by rotating bolt 17, the head of which is disposed at the outer side of said opening, members 15 and 16 may be moved apart transversely of the tire or moved together.

In Fig. 4 a device is shown in place on a tire 19, which tire is shown as disposed in a rim 20 of the modern drop center type.

In operation the device will normally be in assembled position as shown in Fig. 5. When the device is to be placed upon a tire, bolt 17 will be rotated to move members 15 and 16 apart a sufficient distance so that the device can be placed on a tire by moving the same radially inward of the tire. The device will be pushed inwardly until the bottom of portion 16j rests upon the tire tread. At this time portions 15f and 16f are disposed quite a distance inwardly of the widest portion of the tire and somewhat adjacent the rim 20. Bolt 17 can now be turned with an ordinary wrench or with the wrench commonly provided for the wheel bolts. Members 15 and 16 will thus be moved together and as they move together portions 15f and 16f will first engage the tire and grip the same. The curvature of portions 15e and 16e is such that the inner sides of said portions do not engage the tire. The tire can thus be tightly gripped by the portions 15f and 16f and if necessary can expand somewhat toward portions 15e and 16e. After portions 15f and 16f have engaged the side of the tire the portions 15a and 16a come into engagement with the corners of the tread as shown in Fig. 4. Portions 15f and 16f are brought into firm engagement with the tread and the flanges 15d and 16d bite into or press into the tread material. The device is then firmly secured on the tire. By having the portions 15a, 15f, 16a and 16f extend circumferentially of the tire a substantial distance a very secure grip is had on the tire and it is impossible for the device to slip or move circumferentially of the tire.

Figure 11:
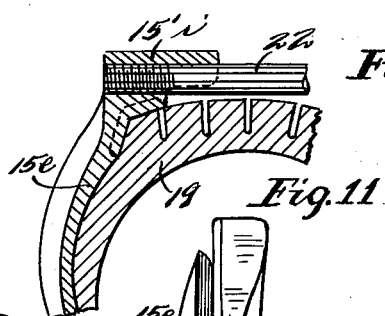
Fig. 11 is a partial view similar to Fig. 4 showing said modified form.
Figure 7:
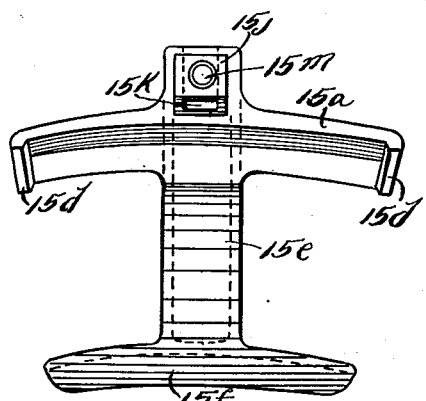
Fig. 7 is a view in side elevation of one of said members as seen from the inside thereof.
Figure 8:
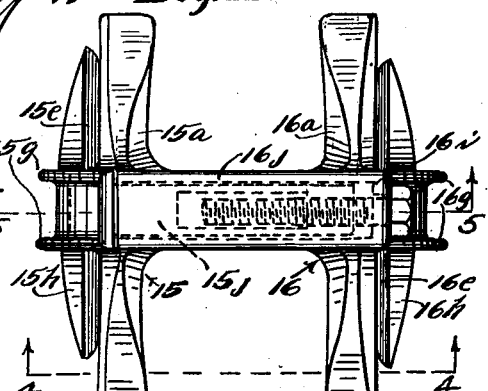
Fig. 8 is a top plan view of the assembled device.
Figure 9:
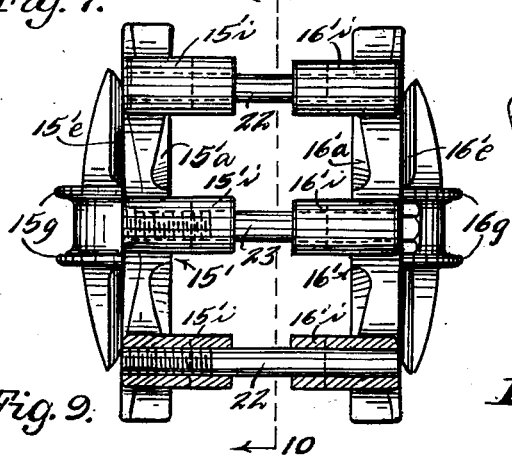
Fig. 9 is a top plan view of a modified form of the device.
Figure 10:
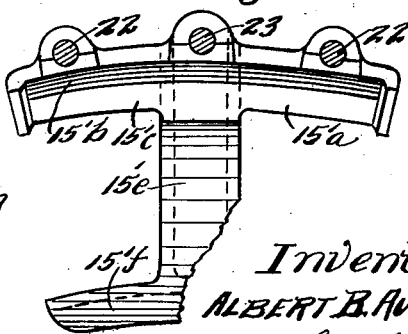
Fig. 10 is a view in vertical section taken on line 10—10 of Fig. 9.

In Figs. 9, 10 and 11 a modification is shown where the members 15' and 16' are similar to members 15 and 16 in the portions 15a, 15e, 15f, 16a, 16e and 16f. Member 15' however, has projecting laterally therefrom a plurality of lugs 15'i. Lugs 15'i are provided with bored and tapped holes. Member 16' is provided with a plurality of lugs 16'i projecting laterally from portion 16'i. Lugs 15'i and 16'i at their end portions are semi-cylindrical in shape. Lugs 16'i are bored and are transversely aligned with lugs 15'i. The outer lugs 15'i have threaded therein rods 22 slidable in lugs 16'i. A bolt 23 is journalled in middle lug 16'i and threaded in middle lug 15'i.

The operation of the device shown in Figs. 9 and 10 is substantially like that of the device already described. Bolt 23 will be turned to separate members 15' and 16' so that the device can be placed over the tire. Bolt 23 will then be turned and will draw members 15' and 16' together to grip the tire as above described. Rods 22 slide in lugs 16'i and act as guides. Rods 22 and bolt 23 will extend across the tire and tread and will provide the necessary traction. With the structure shown in Figs. 9, 10 and 11 the device does not project so much above the tread of the tire as in the structure shown in the other views.

From the above description it will be seen that I have provided a novel, simple and very effective traction device or mud lug. The device comprises few parts and as described, can very easily be placed on and secured on the tire from the convenient point of access. Only one operation is necessary in tightening and that is the turning of the tightening bolt. The device has been amply demonstrated over a long period of testing and found to be very successful and efficient. The present form is the result of many tests of many different forms and models. It is important to have the portions at the corners of the tread and at the inner part of the tire extend quite a distance circumferentially of the tire. A twisting action develops in practice and this must be resisted. The device securely engages the tire at widely spaced points so that the twisting action is effectively resisted. In wet slippery mud or snow it is difficult to keep such a device from circumferential movement. The portions 15d are very effective in this regard. The present device has given remarkable results under the worst conditions of service. The device has been found to be very successful and efficient and it positively retains its place on the tire and is not loosened or moved under the worst conditions.

It will, of course, be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claims.

What is claimed is:

1. A traction device for a pneumatic automobile tire having in combination, two members adapted to be disposed respectively at opposite sides of said tire and having interengaging portions, one of which extends transversely across and engages the tread of said tire, means for causing relative transverse rectilinear bodily movement of said members while inter-engaged so that they may be moved away from each other to place the device over the tire in a radial direction and may be moved toward each other to clamp said tire, said members having inwardly extending portions constructed and arranged to be spaced from said tire adjacent the tread and to a location inwardly of the widest portion of said tire, said portions having circumferentially extending arms at their inner ends constructed and arranged to engage and grip said tire only inwardly of said widest dimension.

2. The structure set forth in claim 1, said arms projecting at opposite sides of said portions and extending some distance circumferentially of said tire and being of arcuate form circumferentially to extend around said tire.

3. The structure set forth in claim 1, said members having arms projecting at opposite sides thereof adjacent the tread of said tire and extending for a considerable distance circumferentially of the tread of said tire, said arms having means adjacent their ends formed with angular recesses therein for gripping the top and sides of the corners of a tread of a tire having a tread with angular corners.

4. A traction device for a pneumatic automobile tire having in combination, a pair of members adapted to be disposed respectively at each side of said tire and having telescoping portions, one of which extends transversely of the tread of said tire, means for causing relative rectilinear bodily movement of said members transversely of said tread while in telescoping relation so that they may be moved away from each other to place the device over the tire in an inwardly radial direction and may then be moved toward each other to clamp said tire, said members having portions extending inwardly to beyond the widest dimension of said tire and constructed and arranged to engage and grip said tire only at a point inwardly of its widest dimension, said portions having terminal parts extending a substantial distance circumferentially of said tire.

5. A traction device for a pneumatic automobile tire having in combination, a pair of members adapted to be disposed respectively at opposite sides of said tire and having interengaging portions, one of which extends transversely of the tread of said tire, means for causing relative transverse rectilinear bodily movement of said members while inter-engaged to move the same away from each other so that the device may be placed over the tire in an inwardly radial direction and can move said members toward each other to cause the same to grip said tire, said members having arms of angular form extending at opposite sides thereof along the corners of the tread of said tire for an appreciable distance circumferentially and said arms having means adjacent their ends for gripping the top and side of a corner of a tread of a tire having angular corners, said members having portions extending inwardly of said tire and constructed and arranged to grip said tire only inwardly of its widest portion.

6. The structure set forth in claim 5, said last mentioned portions being formed as arms extending for an appreciable distance circumferentially of said tire, said members being constructed and arranged so that when moved toward each other said last mentioned arms will first engage the tire and press against the same and said portions of angular form will subsequently engage and grip the corners of said tread.

7. A traction device for a pneumatic automobile tire having in combination, a pair of rigid members adapted to be disposed respectively at opposite sides of said tire, one of said members having a portion extending transversely of the tread of said tire and engaging said tread and said other member having a portion interfitting with said last mentioned portion, means for causing relative transverse rectilinear bodily movement of said members to move the same away from each other so that the device can be placed over said tire in an inwardly radial direction and to move said members toward each other to grip said tire, each of said members having a portion extending inwardly to a point inwardly of the widest dimension of said tire, said portions having arms extending at opposite sides thereof at their inner ends for an appreciable distance circumferentially of said tire and curved to extend around and engage said tire, said members also having arms extending at either side thereof adjacent the tread of said tire and formed with angular portions to engage the top and sides of the corner of a tread of the tire having a tread with angular corners.

ALBERT B. AUSTIN.